United States Patent
Miura (10) Patent No.: US 9,279,466 B2
(45) Date of Patent: Mar. 8, 2016

(54) VEHICLE DISC BRAKE

(71) Applicant: NISSIN KOGYO CO., LTD., Ueda-shi, Nagano (JP)

(72) Inventor: Yasutaka Miura, Westerville, OH (US)

(73) Assignee: NISSIN KOGYO CO., LTD., Ueda-shi (JP)

( * ) Notice: Subject to any disclaimer, the term of this patent is extended or adjusted under 35 U.S.C. 154(b) by 0 days.

(21) Appl. No.: 14/328,465

(22) Filed: Jul. 10, 2014

(65) Prior Publication Data

US 2015/0021127 A1    Jan. 22, 2015

Related U.S. Application Data

(60) Provisional application No. 61/857,047, filed on Jul. 22, 2013.

(51) Int. Cl.
| | |
|---|---|
| *F16D 65/40* | (2006.01) |
| *F16D 65/097* | (2006.01) |
| *F16D 55/00* | (2006.01) |
| *F16D 65/00* | (2006.01) |
| *F16D 65/02* | (2006.01) |

(52) U.S. Cl.
CPC ........ *F16D 65/0977* (2013.01); *F16D 65/0006* (2013.01); *F16D 65/02* (2013.01)

(58) Field of Classification Search
CPC ............. F16D 65/0006; F16D 65/005; F16D 65/0056; F16D 65/02; F16D 65/40; F16D 65/0977

USPC .......... 188/73.31, 73.36, 73.37, 73.38, 73.39
See application file for complete search history.

(56) References Cited

U.S. PATENT DOCUMENTS

| | | | | |
|---|---|---|---|---|
| 5,699,882 | A * | 12/1997 | Ikegami et al. ............ | 188/73.38 |
| 2007/0251772 | A1* | 11/2007 | Tsurumi ..................... | 188/73.38 |
| 2010/0147635 | A1* | 6/2010 | Hayashi ..................... | 188/73.38 |
| 2010/0243385 | A1* | 9/2010 | Kaneko et al. ............. | 188/73.31 |
| 2011/0168503 | A1* | 7/2011 | Chelaidite ................. | 188/73.31 |
| 2012/0222925 | A1* | 9/2012 | Kaneko ...................... | 188/73.38 |

FOREIGN PATENT DOCUMENTS

JP         4713651 B2    6/2011

\* cited by examiner

*Primary Examiner* — Melody Burch
(74) *Attorney, Agent, or Firm* — Westerman, Hattori, Daniels & Adrian, LLP

(57) ABSTRACT

A pad retainer of a vehicle disc brake includes: a pair of retainer portions mounted in pad guide grooves; a connecting piece connecting the pair of retainer portions together; and pad returning portions configured to bias the friction pads to a side opposite to the disc rotor. Each of the pad returning portions includes an elastic loop portion formed into an arc shape by bending a narrow elongated piece, which extends in a direction opposite to the disc rotor from an inner side in a disc radial direction of a deep side piece of the retainer portion, and then back towards the disc rotor; and a holding portion extending from a bent-back end of the elastic loop portion towards the disc rotor and configured to hold a lug piece of the friction pad.

5 Claims, 10 Drawing Sheets

VEHICLE DISC BRAKE

BACKGROUND OF THE INVENTION

1. Field of the Invention

The present invention relates to a vehicle disc brake used for vehicles such as automobiles and motorcycles, and specifically relates to a structure of a pad retainer configured to movably support lug pieces provided at a shoe of a friction pad by pad guide grooves formed in caliper supporting arms.

2. Description of the Related Art

In a conventional vehicle disc brake including lug pieces which are respectively projecting from both side portions of a shoe of a friction pad, the lug pieces are movably supported in pad guide grooves formed in caliper supporting arms of a caliper bracket, so that the friction pads are hung movably in a disc axis direction. In addition, a pad retainer formed of a thin metallic plate is interposed between the pad guide groove and the lug piece. The pad retainer is configured to guide a movement of the friction pad in the disc axis direction, and to return the friction pad from a side surface of a disc rotor when the braking is released.

Some of such pad retainers include a pair of retainer portions mounted in pad guide grooves, a connecting piece extending over an outer edge of a disc rotor so as to connect the pair of retainer portions together, and pad returning portions for biasing friction pads in a direction in which the friction pads move away from the disc rotor. Each retainer portion includes an outer side piece disposed along an outer side surface in a disc radial direction of the pad guide groove, a deep side piece disposed along an opposing surface, and an inner side piece inclining from an end portion of the deep side piece at an inner side in the disc radial direction outwards in the disc radial direction. Each pad returning portion includes: an elastic loop portion formed into an arc shape by bending a narrow elongated piece, which extends in a direction opposite to the disc rotor from an outer side in the disc radial direction of the deep side piece, and then back towards the disc rotor; and the pad returning portion formed of a narrow elongated piece, which extends from a bent-back end of the elastic loop portion in a direction of the disc rotor and gradually inclines in a direction opposite to the deep side piece (see, for example, JP-B 4713651).

The pad retainer in JP-B 4713651 described above is capable of returning the friction pads from side surfaces of the disc rotor by the pad returning portion when the braking is released, but is incapable of stably returning the friction pad in some cases because the pad returning portion is formed of the narrow elongated piece inclining in the direction opposite to the deep side piece.

SUMMARY OF THE INVENTION

Accordingly, an object of the present invention is to provide a vehicle disc brake capable of stably returning friction pads from side surfaces of a disc rotor by pad returning portions formed at pad retainers when the braking is released.

To achieve the above-described object, a vehicle disc brake of the present invention is characterized as follows. Specifically, the vehicle disc brake includes: a pair of caliper supporting arms provided on a caliper bracket which is fixedly provided on a vehicle body, the pair of caliper supporting arms extending over an outer edge of a disc rotor in a disc axis direction; pad guide grooves provided in the caliper supporting arms so as to face each other; and lug pieces projecting from both side portions of a shoe of each of a pair of friction pads disposed to sandwich the disc rotor, the lug pieces movably supported in the pad guide grooves by pad retainers. Each of the pad retainers includes a pair of retainer portions mounted in the pad guide grooves on both sides of the disc rotor, a connecting piece extending over the outer edge of the disc rotor and connecting the pair of retainer portions together, and pad returning portions configured to bias the friction pads to a side opposite to the disc rotor. Each of the pad returning portions includes an elastic loop portion formed into an arc shape by bending a narrow elongated piece, which extends in a direction opposite to the disc rotor from the retainer portion, and then back towards the disc rotor, and a holding portion extending from a bent-back end of the elastic loop portion towards the disc rotor and configured to hold the lug piece. The friction pads move in the disc axis direction while the holding portions hold the lug pieces.

In addition, it is preferable that: the pad guide grooves be each formed into an angular U-shape having an outer side surface in a disc radial direction, an inner side surface in the disc radial direction, and an opposing surface connecting the two side surfaces; the retainer portion include an outer side piece disposed along the outer side surface in the disc radial direction of the pad guide groove, an inner side piece disposed along the inner side surface in the disc radial direction, and a deep side piece disposed along the opposing surface and connecting the inner side piece and the outer side piece together; the elastic loop portion be formed continuously to the deep side piece; and the holding portion include a guide piece that is a narrow elongated piece extending from the bent-back end of the elastic loop portion, the guide piece being extended towards the disc rotor in parallel to the deep side piece and disposed along an outer end surface of the lug piece, and a holding piece that is a narrow elongated piece extending from a distal end of the guide piece, the holding piece being bent to a side opposite to the deep side piece and disposed along a disc-rotor-side surface of the lug piece. Further preferably, the guide piece includes a guiding projection piece projecting towards the deep side piece, and the deep side piece includes a guide hole parallel to a disc axis for the guiding projection piece to be inserted therein, the guide hole configured to guide a movement of the guiding projection piece. In addition, the holding piece preferably includes a supporting piece projecting towards the outer side piece along the disc-rotor-side surface of the lug piece. Furthermore, the inner side piece preferably extends from an end portion of the deep side piece at an inner side in the disc radial direction while inclining outwards in the disc radial direction. Moreover, the inner side piece preferably has a tongue piece portion formed by cutting the inner side piece. The tongue piece portion projects while inclining inwards in the disc radial direction from the deep side piece side to a distal end side of the tongue piece portion, and the distal end abuts against the inner side surface in the disc radial direction of the pad guide groove.

EFFECTS OF THE INVENTION

In the vehicle disc brake of the present invention, the pad returning portions provided to the pad retainer includes the elastic loop portion formed into an arc shape by bending a narrow elongated piece, which extends in the direction opposite to the disc rotor from the retainer portions, and then back towards the disc rotor, and the holding portion extending from the bent-back end of the elastic loop portion towards the disc rotor and configured to hold the lug pieces. Accordingly, when the braking is released, the friction pads can be stably returned from the side surfaces of the disc rotor while the holding portions hold the lug pieces.

In addition, the holding portion is formed by bending a narrow elongated piece extending from the bent-back end of the elastic loop portions to include the guide piece disposed along the outer end surface of the lug piece and the holding piece disposed along the disc-rotor-side surface of the lug piece. Accordingly, the holding portion can be formed into a simple structure. Further, the guide piece includes the guiding projection piece projecting towards the deep side piece, and the deep side piece includes the guide hole parallel to the disc axis for the guiding projection piece to be inserted therein, the guide hole configured to guide a movement of the guiding projection piece. Accordingly, even when the vehicle body vibrates, the guiding projection piece and the guide hole engaged with each other suppress the vibration of the holding portion, and can suppress the rattling of the lug piece within the guide groove. This makes it possible to suppress a clonking noise (collision sound) generated by collision between the lug piece and the pad guide groove. Moreover, since the holding piece includes the supporting piece projecting towards the outer side piece along the disc-rotor-side surface of the lug piece, the holding portion can surely hold the lug piece.

Furthermore, by providing the inner side piece to extend from the end portion of the deep side piece at the inner side in the disc radial direction while inclining outwards in the disc radial direction, the lug piece is biased outwards in the disc radial direction, and the lug piece abuts against the outer side surface in the disc radial direction of the pad guide groove at all times. Accordingly, this makes it possible to prevent the lug pieces from rattling within the pad guide groove. Additionally, the inner side piece includes the tongue piece portion projecting while inclining inwards in the disc radial direction from the proximal end side to the distal end side thereof, and the distal end abuts against the inner side surface in the disc radial direction of the pad guide groove. Accordingly, the tongue piece portion also receives the load applied to the inner side piece. This makes it possible to surely bias the lug piece outwards in the disc radial direction, and surely suppress rattling of the friction pad.

DESCRIPTION OF THE PREFERRED EMBODIMENTS

FIGS. 1 to 10 are views for illustrating an embodiment of a vehicle disc brake of the present invention. An arrow A indicates a rotational direction of a disc rotor configured to rotate together with a front wheel when a vehicle travels forwards. A disc rotation outlet side and a disc rotation inlet side to be described later are those resulting when the vehicle travels forwards.

The vehicle disc brake 1 includes: a disc rotor 2 configured to rotate together with a wheel; a caliper bracket 3 fixedly provided on a vehicle body on one side portion of the disc rotor 2; a caliper body 5 configured to be supported movably in a disc axis direction via a pair of slide pins 4, 4 by caliper supporting arms 3a, 3a of the caliper bracket 3; and a pair of friction pads 6, 6 disposed to face each other and to sandwich the disc rotor 2 on inner sides of an acting portion 5a and a reacting portion 5b of the caliper body 5.

The caliper body 5 is made up of the acting portion 5a and the reacting portion 5b disposed on both sides of the disc rotor 2, and a bridge portion 5c extending over an outer edge of the disc rotor 2 to connect the acting portion 5a and the reacting portion 5b together. In the acting portion 5a, cylinder bores 5d, 5d are also provided in a disc circumferential direction, the cylinder bores 5d, 5d opened at the disc rotor 2 side. The cylinder bores 5d, 5d are configured to accommodate bottomed cylindrical pistons 7, 7. Each of the pistons 7 is configured to move the cylinder bore 5d in a direction to the disc rotor by the pressure of a hydraulic fluid supplied to a hydraulic chamber 8 at a bottom portion of the cylinder bore. In addition, vehicle body mounting arms 5e, 5e are provided at both side portions in the disc rotational direction of the acting portion 5a so as to project therefrom. The slide pin 4 is provided at a distal end of each of the vehicle body mounting arms 5e by a mounting bolt 9 so as to project therefrom.

The caliper supporting arms 3a, 3a have such a shape that the caliper supporting arms 3a, 3a extend over the outer edge of the disc rotor 2 in a disc axis direction from both side portions in the disc rotational direction of the caliper bracket 3 while holding both sides of the bridge portion 5c, and further extend at the other side portion of the disc rotor 2 in a disc center direction along a side wall of the reacting portion 5b. Distal end portions of the caliper supporting arms 3a, 3a are connected by a tie rod 3b.

Each of the caliper supporting arms 3a is provided with a pin hole 3c configured to accommodate the above-described slide pin 4, and also provided with four pad guide grooves 3d, 3d facing each other at side portions of the disc rotor 2. Each of the pad guide grooves 3d is formed into an angular U-shape having an outer side surface 3e in a disc radial direction, an inner side surface 3f in the disc radial direction, and an opposing surface 3g connecting the two side surfaces 3e, 3f together. Each of the friction pads 6 has lug pieces 6b, 6b at both side portions of a shoe 6a so as to project therefrom. The lug pieces 6b, 6b are movably supported by pad retainers 10, respectively, in the pad guide grooves 3d, 3d at the disc rotor rotation inlet side and rotation outlet side.

Each friction pad 6 has the lug pieces 6b, 6b projecting from both side portions of the shoe 6a, and a lining 6c affixed to one side surface of the shoe 6a. The lug pieces 6b, 6b have outer end surfaces 6d, 6d both formed into such a stepped shape that a projecting length on an inner side in the disc radial direction is shorter than a projecting length on an outer side in the disc radial direction.

The pad retainer 10 includes: a pair of retainer portions 10a, 10a mounted in the pad guide grooves 3d, 3d on both the sides of the disc rotor at the disc rotation inlet side or the disc rotation outlet side; pad returning portions 10c, 10c extending towards the disc rotor via elastic loop portions 10b, 10b provided at opposite sides of the retainer portions 10a, 10a to the disc rotor; a connecting piece 10d extending over the outer edge of the disc rotor 2 and connecting upper portions of the retainer portions 10*a*, 10*a* together; and a mounting piece 10*e* projecting from a middle portion of the connecting piece 10*d* to a disc inner circumferential side and configured to be locked in a rotor groove 3*h* of the caliper supporting arm 3*a*.

Each of the retainer portions 10*a* includes: an outer side piece 10*f* disposed along the outer side surface 3*e* in the disc radial direction of the pad guide groove 3*d*; a deep side piece 10*g* disposed along the opposing surface 3*g*; and a pad spring-back piece 10*h* (inner side piece of the present invention) extending from an end portion of the deep side piece 10*g* at an inner side in the disc radial direction while inclining outwards in the disc radial direction. The outer side piece 10*f* and the deep side piece 10*g* are connected together at a right angle. The pad spring-back piece 10*h* has a tongue piece portion 10*i* formed by cutting a central portion in the disc axis direction of a proximal end portion of the pad spring-back piece 10*h*. The tongue piece portion 10*i* projects while inclining inwards in the disc radial direction from a proximal end side to a distal end side thereof. A distal end of the tongue piece portion 10*i* abuts against the inner side surface 3*f* in the disc radial direction. Further, a distal end side of the pad spring-back piece 10*h* has a lug-piece movably-supporting portion 10*j* formed. The lug-piece movably-supporting portion 10*j* is curved in a convex shape outwards in the disc radial direction and configured to movably support the lug piece 6*b*, while abutting against an inner side surface 6*g* in the disc radial direction of the lug piece 6*b*. In addition, an insertion guide piece 10*k* is provided at an opposite side of the outer side piece 10*f* and the deep side piece 10*g* to the disc rotor so as to be opened outwards to thereby facilitate the insertion of the lug piece 6*b* of the friction pad 6. Furthermore, a positioning piece 10*m* is provided at the disc rotor side of the deep side piece 10*g* and configured to abut against a disc rotor side surface at the caliper supporting arm 3*a*.

The pad returning portion 10*c* includes: the elastic loop portion 10*b* formed into an arc shape by bending a narrow elongated piece, which extends in a direction opposite to the disc rotor from the inner side in the disc radial direction of the deep side piece 10*g*, and then back towards the disc rotor; and a holding portion 10*n* extending from a bent-back end of the elastic loop portion 10*b* towards the disc rotor and configured to hold the lug piece 6*b*. The holding portion 10*n* includes: a guide piece 10*p* that is a narrow elongated piece extending from the bent-back end of the elastic loop portion 10*b*, the guide piece 10*p* being extended towards the disc rotor in parallel to the deep side piece 10*g* and disposed along the outer end surface 6*d* of the lug piece 6*b*; and a holding piece 10*q* that is a narrow elongated piece extending from a distal end of the guide piece 10*p*, the holding piece 10*q* being bent to a side opposite to the deep side piece and disposed along a disc-rotor-side surface 6*e* of the lug piece 6*b*. The guide piece 10*p* includes a guiding projection piece 10*r* projecting towards the deep side piece 10*g*. The deep side piece 10*g* has a guide hole 10*s* formed in parallel to a disc axis for the guiding projection piece 10*r* to be inserted therein, the guide hole 10*s* configured to guide a movement of the guiding projection piece 10*r*. Moreover, the holding piece 10*q* includes a supporting piece 10*t* projecting towards the outer side piece along the disc-rotor-side surface of the lug piece 6*b*. Further, a distal end portion of the holding piece 10*q* has a wear detecting portion 10*u* formed by folding the narrow elongated piece towards the disc rotor.

In the pad retainer 10 formed as described above, the retainer portions 10*a*, 10*a* are inserted in the pad guide grooves 3*d*, 3*d*; the connecting piece 10*d* is disposed along the caliper supporting arm 3*a*; and the mounting piece 10*e* is mounted on the caliper bracket 3 while being locked in the rotor groove 3*h*. By the mounting in this manner, the outer side piece 10*f* of each retainer portion 10*a* abuts against the outer side surface 3*e* in the disc radial direction of each pad guide groove 3*d*, and the distal end of the tongue piece portion 10*i* abuts against the inner side surface 3*f* in the disc radial direction. Further, each of the elastic loop portions 10*b* is disposed at the opposite side of the caliper supporting arm 3*a* to the disc rotor and at the inner side in the disc radial direction of the pad guide groove 3*d*. In addition, the holding portions 10*n* are disposed closer to the disc rotor than the elastic loop portions 10*b* are.

While the elastic loop portions 10*b*, 10*b* are elastically deformed, the lug pieces 6*b*, 6*b* of the shoe 6*a* of each friction pad 6 are disposed in the holding portions 10*n*, 10*n* from opposite sides of the pad guide grooves 3*d*, 3*d* to the disc rotor at the disc rotation inlet and rotation outlet sides. Thereby, outer sides in the disc radial direction of the outer end surfaces 6*d*, 6*d* of the lug pieces 6*b*, 6*b* abut against the deep side pieces 10*g*, 10*g* of the pad retainers 10, while inner sides in the disc radial direction of the outer end surfaces 6*d*, 6*d* abut against the guide pieces 10*p*, 10*p*. In addition, the elastic loop portions 10*b*, 10*b* are disposed at the inner sides in the disc radial direction of the lug pieces 6*b*, 6*b* and at the opposite sides thereof to the disc rotor. Further, the holding pieces 10*q*, 10*q* and the supporting pieces 10*t*, 10*t* abut against the disc-rotor-side surfaces 6*e*, 6*e* of the lug pieces 6*b*, 6*b*. Moreover, the spring-back force of the pad spring-back pieces 10*h*, 10*h* biases the lug pieces 6*b*, 6*b* outwards in the disc radial direction, and outer side surfaces 6*f*, 6*f* in the disc radial direction of the lug pieces 6*b*, 6*b* are pressed against the outer side surfaces 3*e*, 3*e* in the disc radial direction of the pad guide grooves 3*d*, 3*d*.

In the embodiment formed as described above, when the driver performs a braking operation, a high-pressure hydraulic fluid is supplied into the hydraulic chambers 8, 8, and the pistons 7, 7 travel forwards into the cylinder bores 5*d*, 5*d*. Thereby, the friction pads 6 on the acting portion 5*a* side are pressed against one side surface of the disc rotor 2. Next, the reaction force moves the caliper body 5 in the direction of the acting portion while the caliper body 5 is being guided by the slide pins 4, 4. Reaction force claws 5*f* press the friction pads 6 on the reacting portion side against the other side surface of the disc rotor 2.

Figure 1:
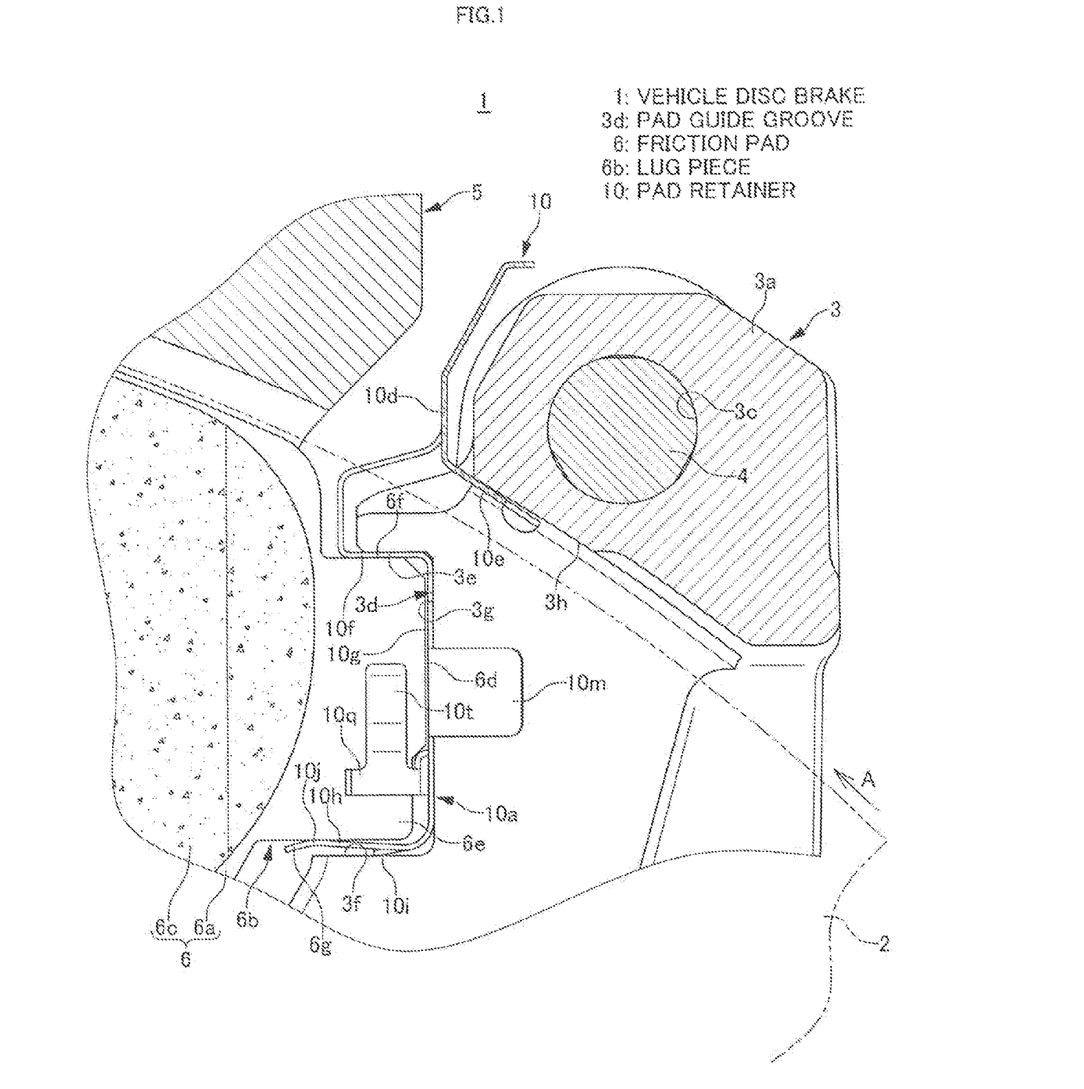
FIG. 1 is an enlarged sectional view of a main part of a vehicle disc brake for illustrating an embodiment of the present invention.
Figure 2:
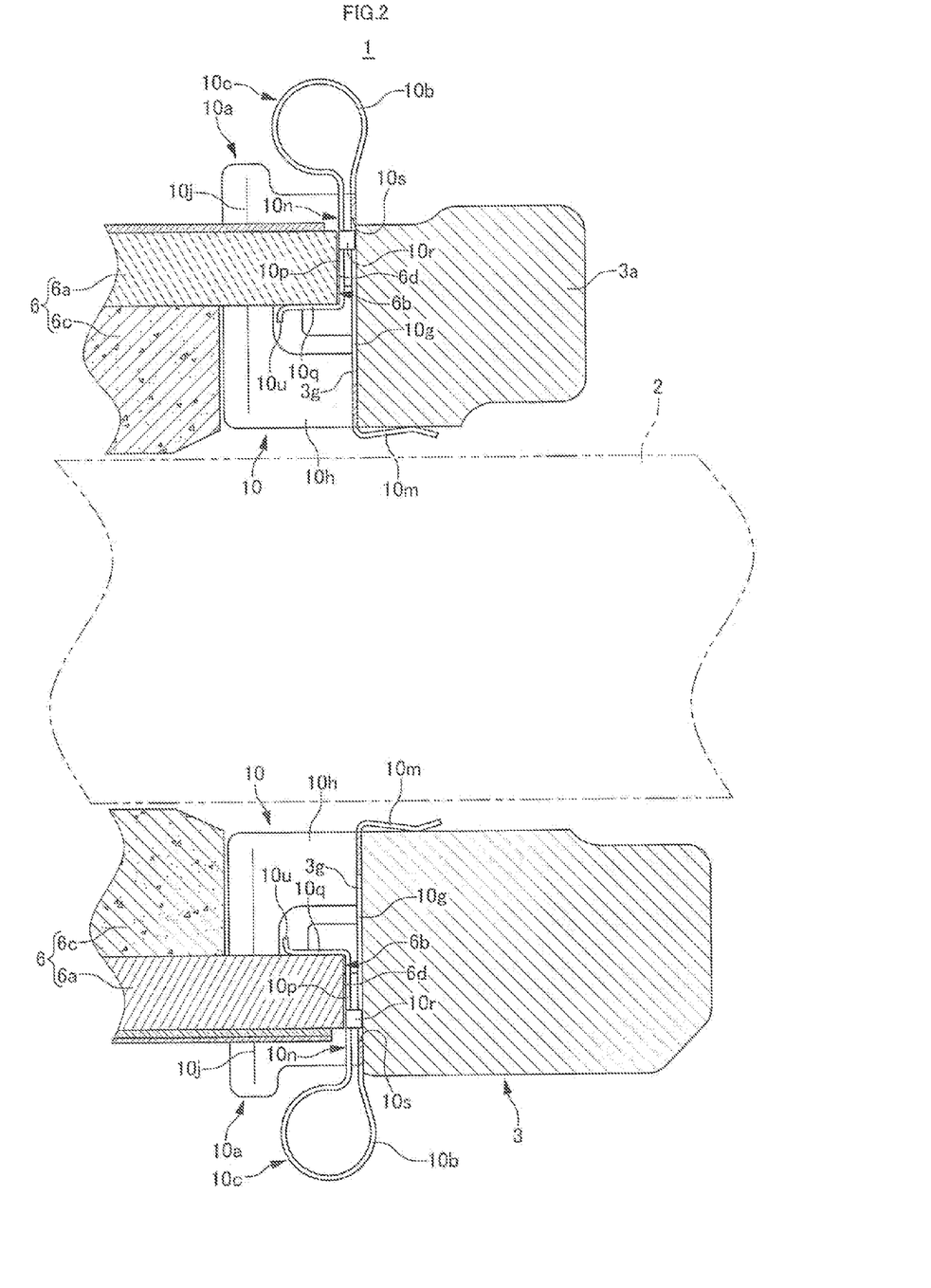
FIG. 2 is an enlarged sectional view of a main part of the vehicle disc brake.
Figure 3:
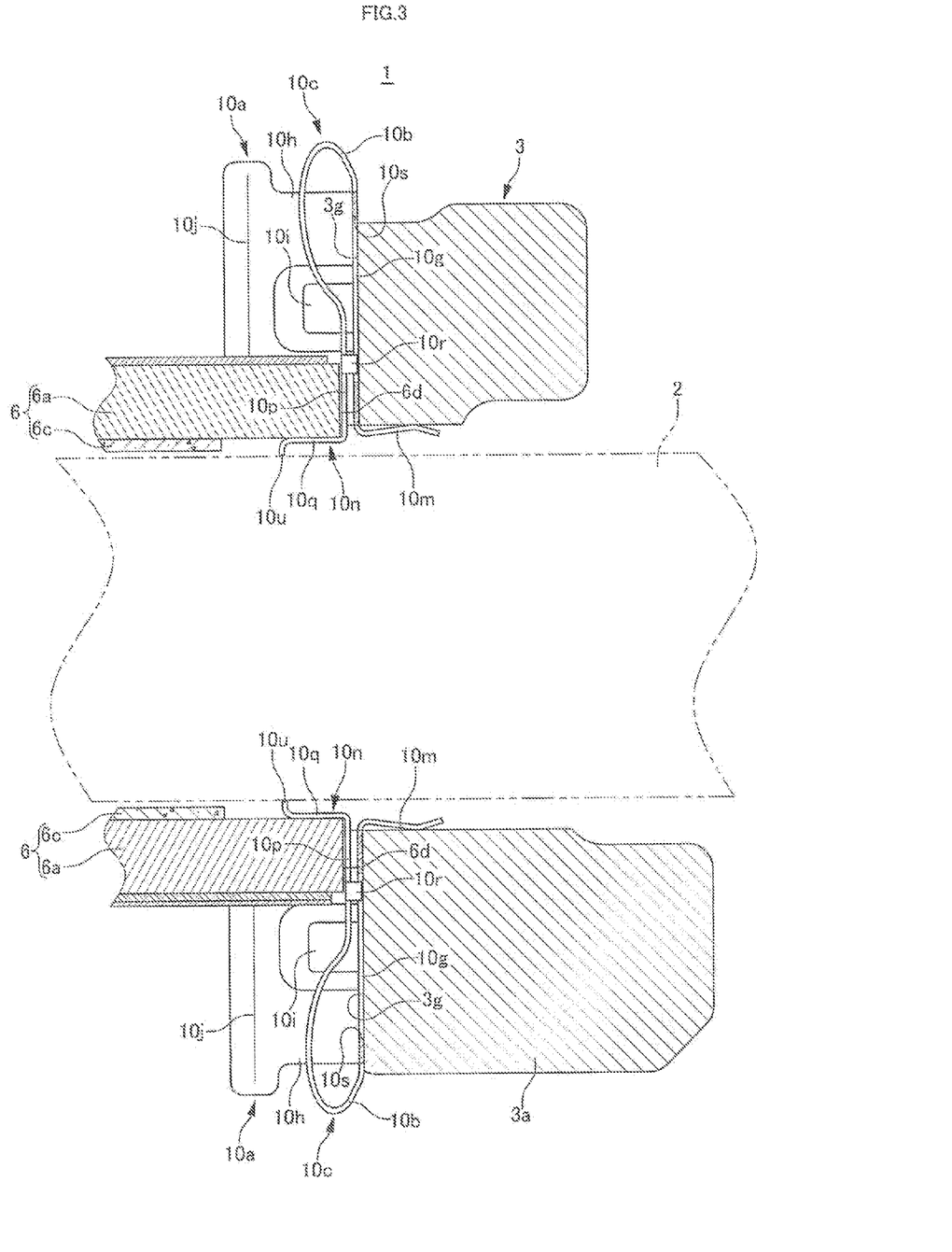
FIG. 3 is an enlarged sectional view of the main part of the vehicle disc brake when the braking is applied in a state where a wear amount exceeds a predetermined level.
Figure 4:
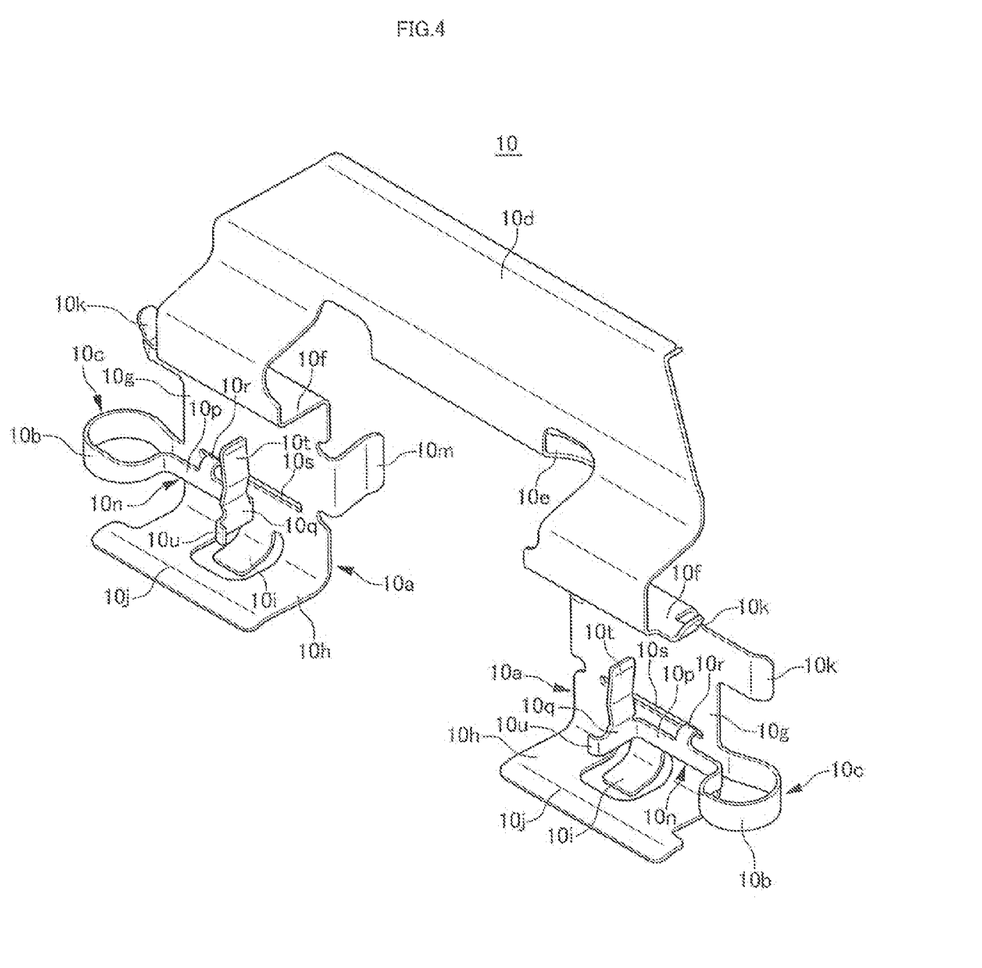
FIG. 4 is a perspective view of a pad retainer according to the embodiment of the present invention.
Figure 5:
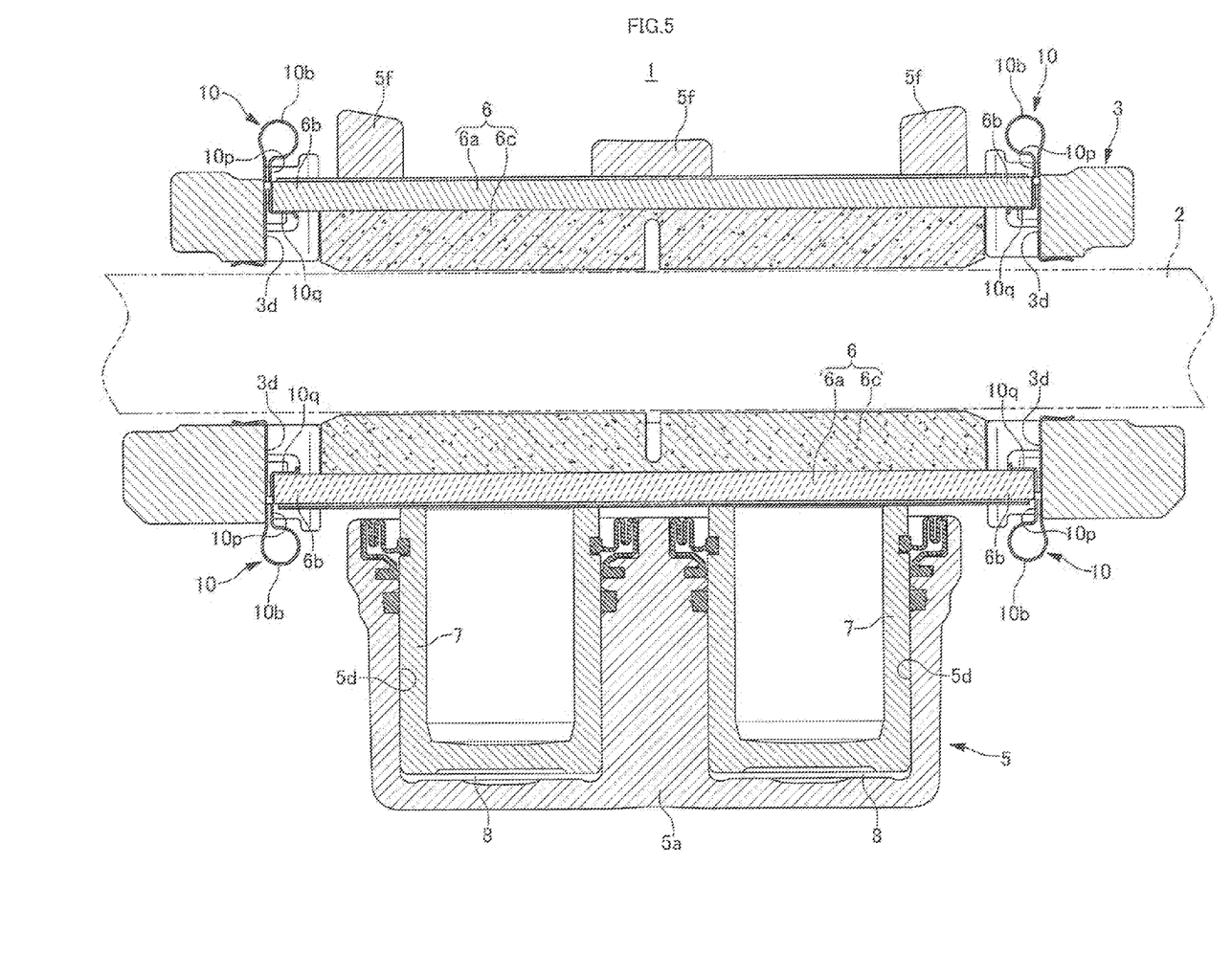
FIG. 5 is a sectional view taken along the line V-V in FIG. 9.
Figure 6:
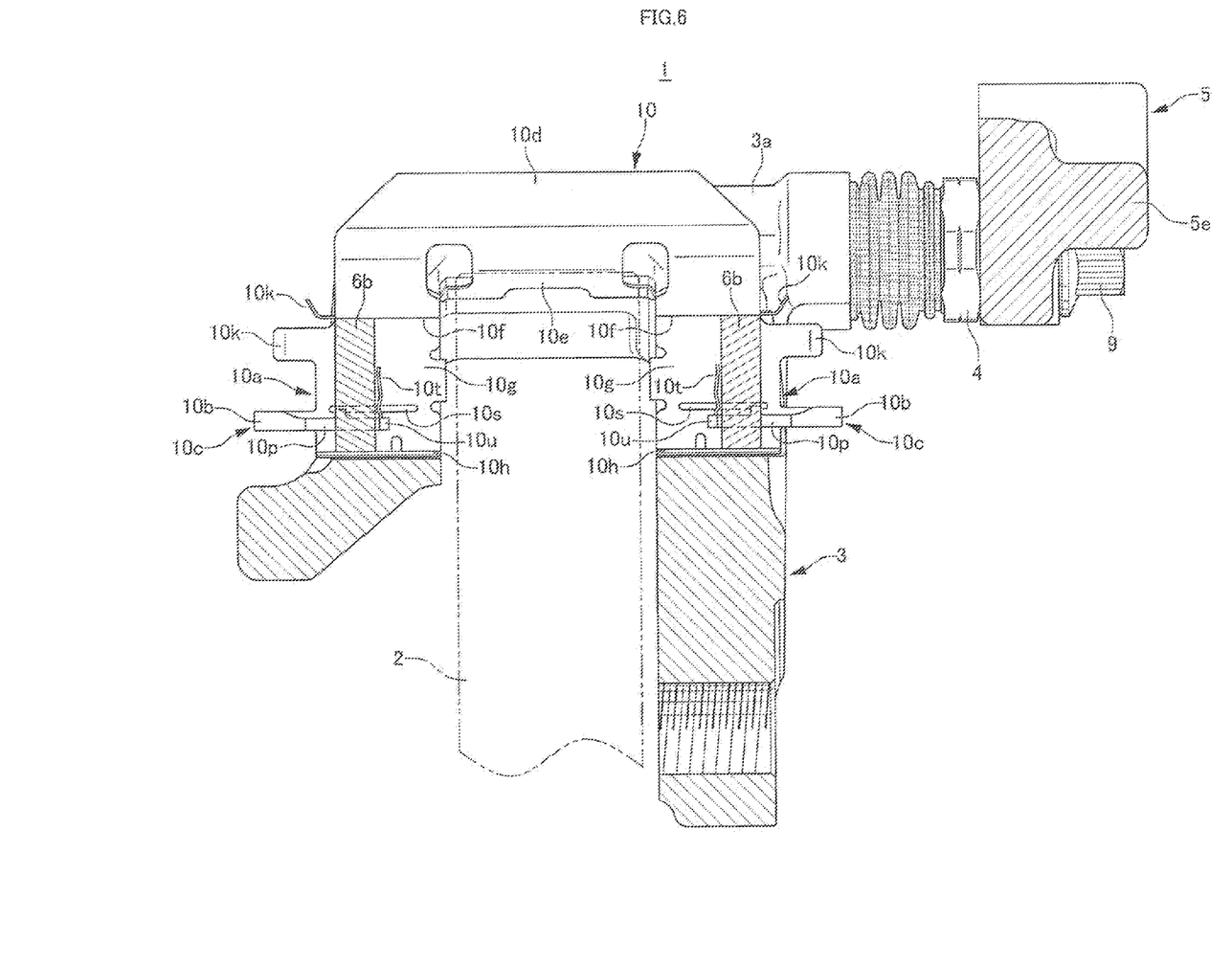
FIG. 6 is a sectional view taken along the line VI-VI in FIG. 9.
Figure 7:
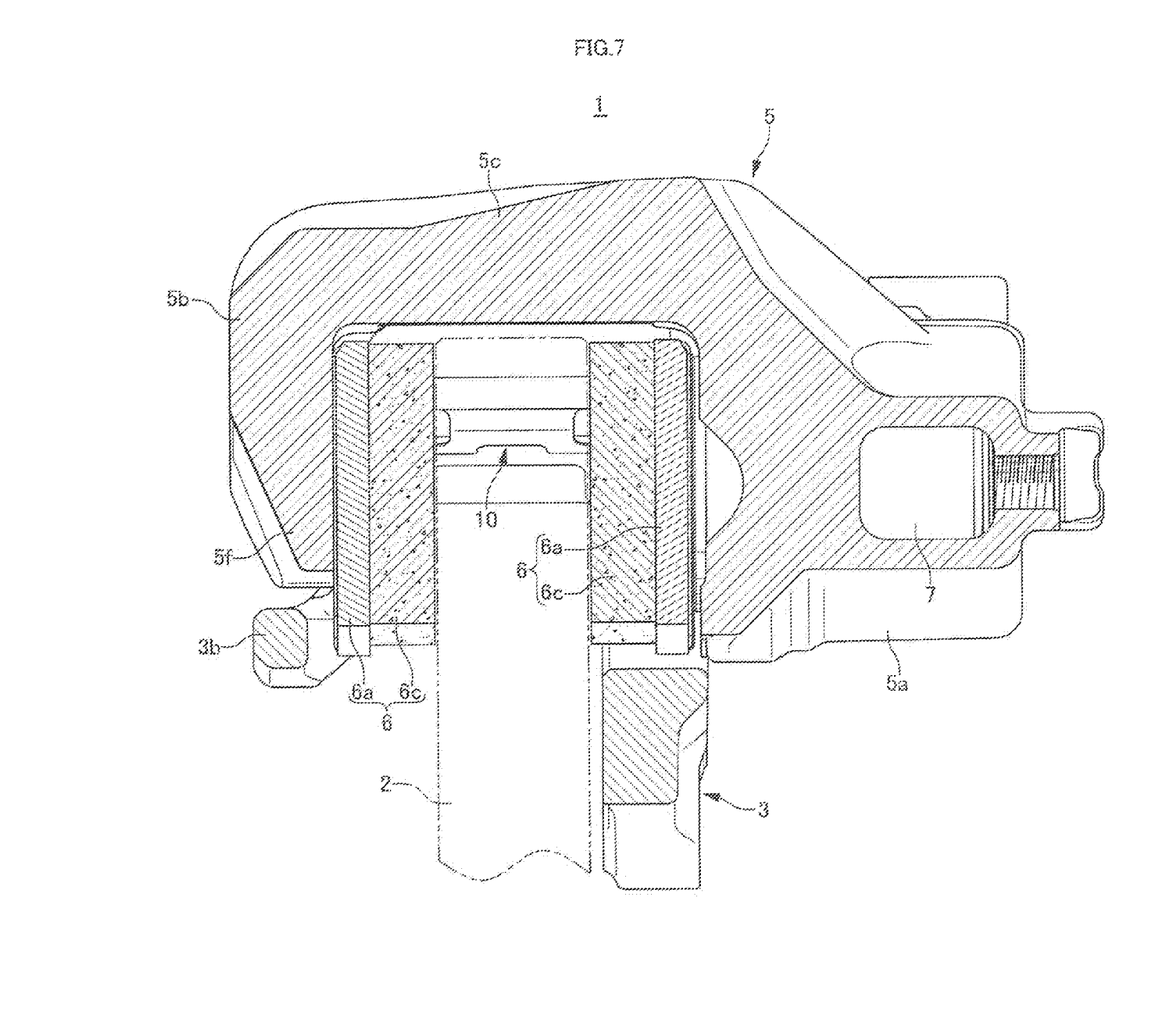
FIG. 7 is a sectional view taken along the line VII-VII in FIG. 9.
Figure 8:
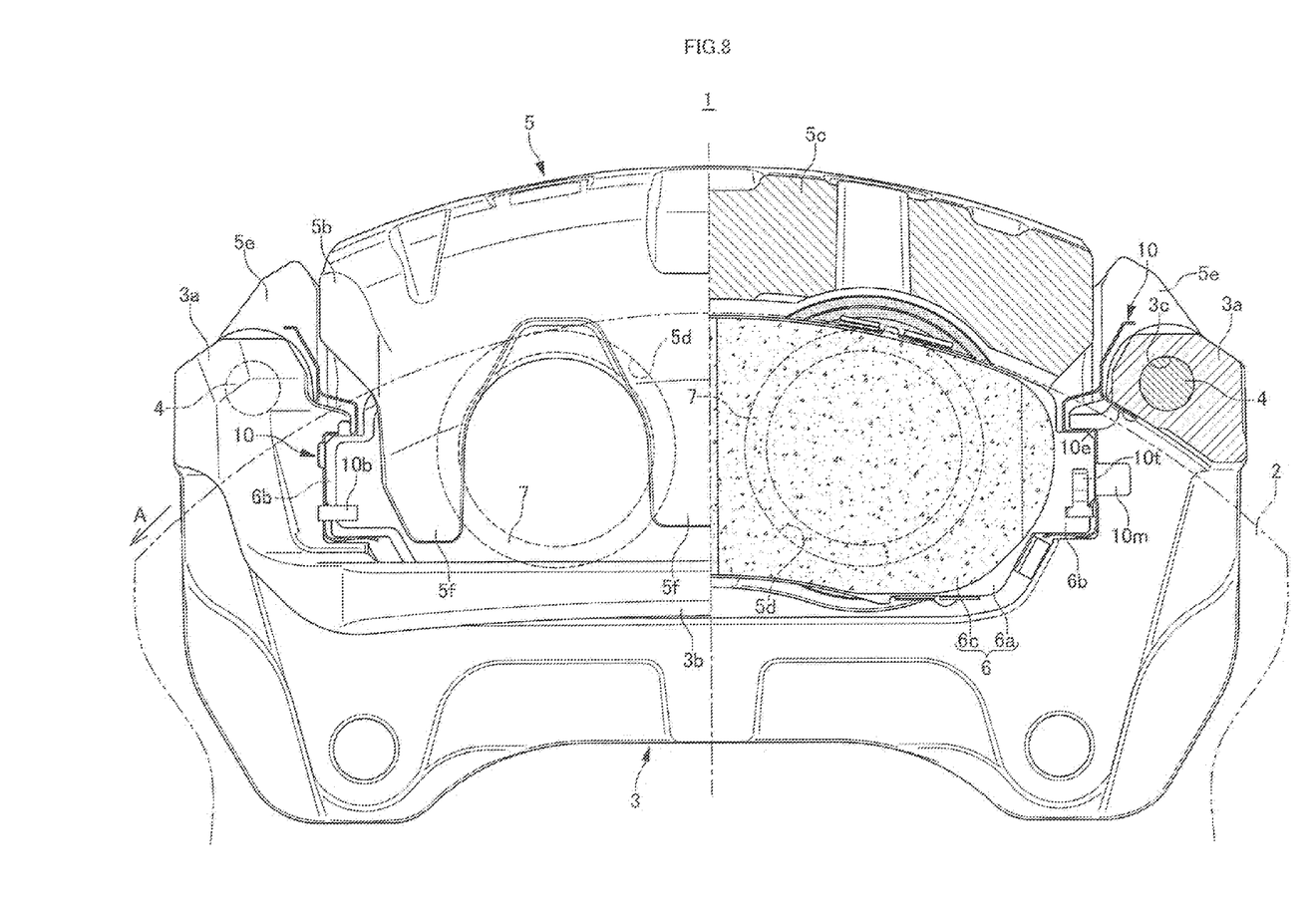
FIG. 8 is a partially sectional rear view of the vehicle disc brake for illustrating the embodiment of the present invention.
Figure 9:
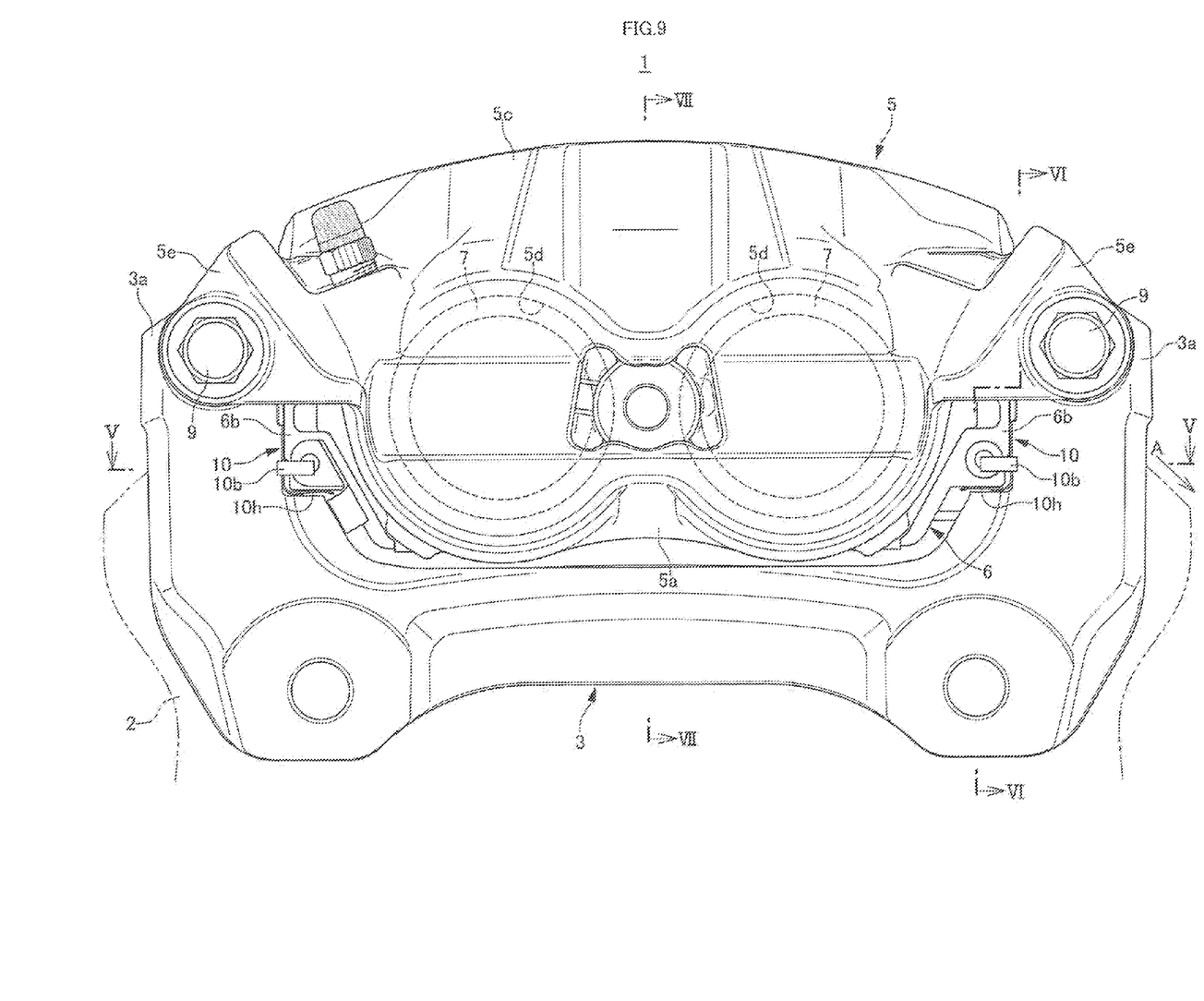
FIG. 9 is a front view of the vehicle disc brake.
Figure 10:
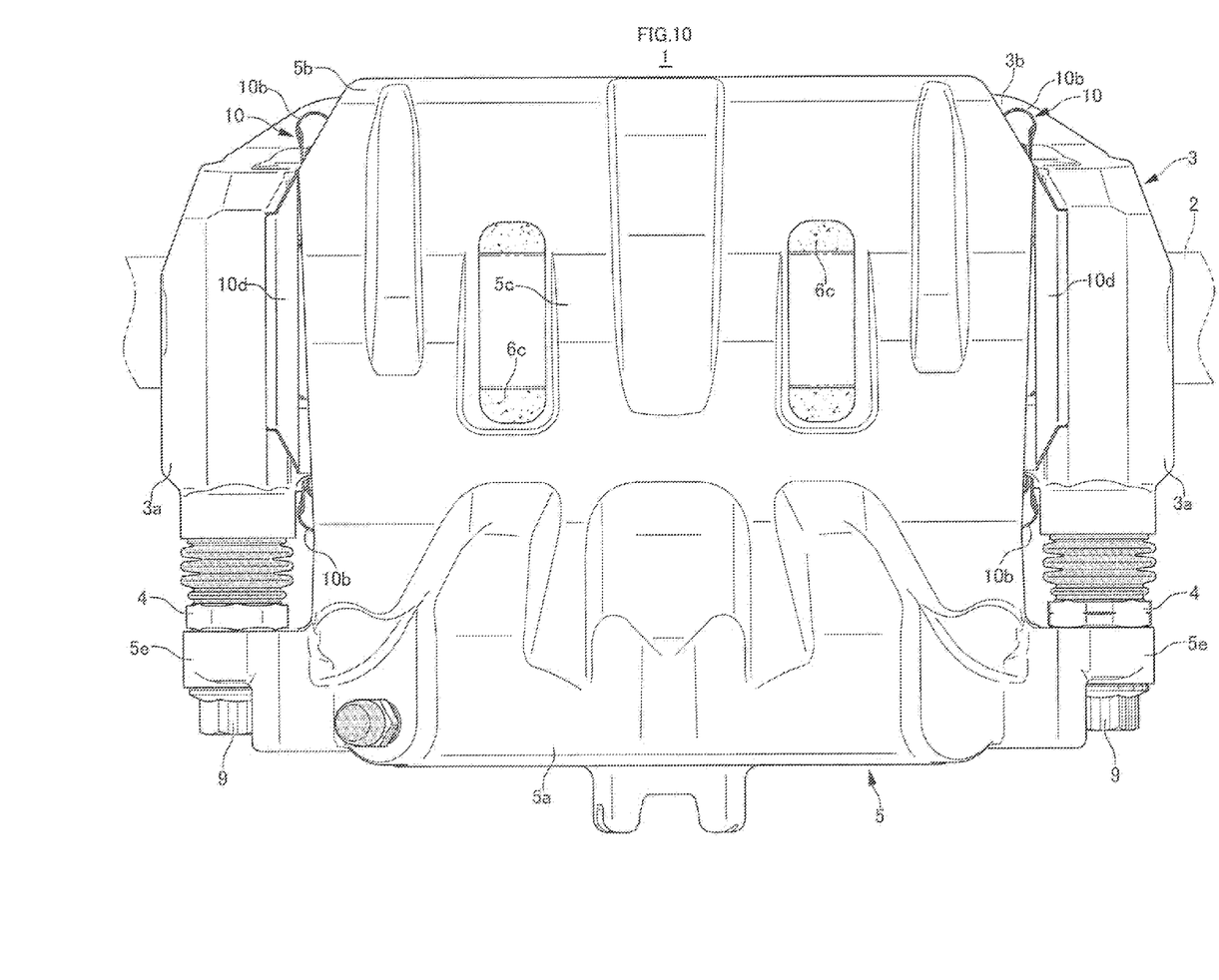
FIG. 10 is a plan view of the vehicle disc brake.

As this occurs, as shown in FIG. 3, the lug pieces 6*b*, 6*b* of each friction pad 6 press the holding pieces 10*q*, 10*q* and the supporting pieces 10*t*, 10*t* toward the disc rotor 2, and the holding portions 10*n*, 10*n* move together with the lug pieces 6*b*, 6*b* towards the disc rotor 2, while deforming the elastic loop portions 10*b*, 10*b*. The guiding projection piece 10*r* moves towards the disc rotor 2, while being guided by the guide hole 10*s*. Moreover, the pad spring-back pieces 10*h*, 10*h* bias the lug pieces 6*b*, 6*b* outwards in the disc radial direction, while the outer side surfaces 3*e*, 3*e* in the disc radial direction abut against the outer side pieces 10*f*, 10*f* of the pad retainer 10. Furthermore, the outer sides in the disc radial direction of the outer end surfaces 6*d*, 6*d* of the lug pieces 6*b*, 6*b* abut against the deep side pieces 10*g*, 10*g*. Accordingly, the lug pieces 6*b*, 6*b* can smoothly move within the pad guide grooves 3*d*, 3*d*, while being guided by the outer side pieces 10*f*, 10*f* and the deep side pieces 10*g*, 10*g*.

In addition, since the distal ends of the tongue piece portions 10*i*, 10*i* abut against the inner side surfaces 3*f*, 3*f* in the disc radial direction of the pad guide grooves 3*d*, 3*d*, the load applied to the pad spring-back pieces 10*h*, 10*h* can also be received by the tongue piece portions 10*i*, 10*i*. While the lug-piece movably-supporting portions 10*j*, 10*j* are pressed towards the inner side surface 3f in the disc radial direction, the pad spring-back pieces 10h, 10h surely bias the lug pieces 6b, 6b outwards in the disc radial direction, and the lug pieces 6b, 6b are pressed against the outer side surfaces 3e, 3e in the disc radial direction of the pad guide grooves 3d, 3d at all times. Accordingly, when the braking is applied, the lug pieces 6b, 6b do not rattle within the pad guide grooves 3d, 3d, thereby making it possible to prevent a clonking noise due to rattling. Furthermore, when the lining 6c of the friction pad 6 is worn in an amount exceeding a predetermined level by repeating the braking, the wear detecting portion 10u slidingly comes into contact with the disc rotor 2 as shown in FIG. 3, so that the user can be informed of the wearing state of the lining 2.

On the other hand, when the braking operation is stopped and the pistons 7 and the reaction force claws 5f are retreated to their original positions before the braking, the elastic loop portions 10b, 10b will restore their initial shapes. Accordingly, the lug pieces 6b, 6b held in the holding portions 10n, 10n are pressed together with the holding portions 10n, 10n toward the side opposite to the disc rotor. Thereby, each friction pad 6 is stably forced to be separated apart from the side surface of the disc rotor 2, and the dragging of each friction pad 6 is prevented, making possible to suppress brake judder produced by wearing of the disc rotor 2 and suppress brake noise.

In addition, when a vibration larger than usual is generated on the vehicle body, for example, in driving over a step during running, the guiding projection piece 10r and the guide hole 10s engaged with each other suppress the vibration of the holding portion 10n, and can suppress the rattling of the lug piece 6b within the guide groove 3d. Accordingly, this makes it possible to suppress a clonking noise generated by collision between the lug piece 6b and the pad guide groove 3d.

Note that the present invention is not limited to the above-described embodiment. The tongue piece portion does not have to be provided to the pad spring-back piece of the pad retainer. In addition, it is not necessary that the inner side piece incline from the end portion of the deep side piece at the inner side in the disc radial direction outwards in the disc radial direction. Instead, the inner side piece may be disposed along the outer side surface in the disc radial direction of the pad guide groove. Further, the shapes of the connecting piece and the mounting piece of the pad retainer, as well as the shapes and the number of the insertion guide piece and the positioning piece are arbitrary. Moreover, the pad retainer does not have to include the wear detecting portion. Furthermore, the friction pad is not limited to one provided with the lug pieces at the shoe, and the pad retainer may have pad returning springs mounted on both side portions of the shoe.

What is claimed is:

1. A vehicle disc brake comprising:
   a pair of caliper supporting arms provided on a caliper bracket which is fixedly provided on a vehicle body, the pair of caliper supporting arms extending over an outer edge of a disc rotor in a disc axis direction;
   pad guide grooves provided in the caliper supporting arms so as to face each other; and
   lug pieces projecting from both side portions of a shoe of each of a pair of friction pads disposed to sandwich the disc rotor, the lug pieces movably supported in the pad guide grooves by pad retainers, each of the pad retainers including
      a pair of retainer portions mounted in the pad guide grooves on both sides of the disc rotor,
      a connecting piece extending over the outer edge of the disc rotor and connecting the pair of retainer portions together, and
      pad returning portions configured to bias the pair of friction pads to a side opposite to the disc rotor,
   wherein each of the pad returning portions includes
      an elastic loop portion formed into an arc shape by bending a narrow elongated piece, which extends in a direction opposite to the disc rotor from a corresponding one of the pair of retainer portions, and then back towards the disc rotor, and
      a holding portion extending from a bent-back end of the elastic loop portion towards the disc rotor and configured to hold a corresponding one of the lug pieces, and
   wherein the pair of friction pads move in the disc axis direction while the holding portions hold the lug pieces,
   wherein the pad guide grooves are each formed into an angular U-shape having an outer side surface in a disc radial direction, an inner side surface in the disc radial direction, and an opposing surface connecting the two side surfaces,
   wherein each of the pair of retainer portions includes
      an outer side piece disposed along the outer side surface in the disc radial direction of the pad guide groove,
      an inner side piece disposed along the inner side surface in the disc radial direction of the pad guide groove, and
      a deep side piece disposed along the opposing surface of the pad guide groove and connecting the inner side piece and the outer side piece together,
   wherein the elastic loop portion is formed continuously to the deep side piece,
   wherein each of the holding portions include a guide piece that is a narrow elongated piece extending from the bent-back end of the elastic loop portion, the guide piece being extended towards the disc rotor in parallel to the deep side piece and disposed along an outer end surface of the lug piece,
   wherein the guide piece includes a guiding projection piece projecting towards the deep side piece, and
   wherein the deep side piece includes a guide hole parallel to a disc axis for the guiding projection piece to be inserted therein, the guide hole configured to guide a movement of the guiding projection piece.

2. The vehicle disc brake according to claim 1,
   wherein each of the holding portions further includes a holding piece that is a narrow elongated piece extending from a distal end of the guide piece, the holding piece being bent to a side opposite to the deep side piece and disposed along a disc-rotor-side surface of the corresponding one of the lug pieces.

3. A vehicle disc brake comprising:
   a pair of caliper supporting arms provided on a caliper bracket which is fixedly provided on a vehicle body, the pair of caliper supporting arms extending over an outer edge of a disc rotor in a disc axis direction;
   pad guide grooves provided in the caliper supporting arms so as to face each other; and
   lug pieces projecting from both side portions of a shoe of each of a pair of friction pads disposed to sandwich the disc rotor, the lug pieces movably supported in the pad guide grooves by ad retainers each of the s ad retainers including
      a pair of retainer portions mounted in the pad guide grooves on both sides of the disc rotor a connecting piece extending over the outer edge of the disc rotor and connecting the pair of retainer portions together, and pad returning portions configured to bias the pair of friction pads to a side opposite to the disc rotor, wherein each of the pad returning portions includes an elastic loop portion formed into an arc shape by bending a narrow elongated piece, which extends in a direction opposite to the disc rotor from a corresponding one of the pair of retainer portions, and then back towards the disc rotor, and a holding portion extending from a bent-back end of the elastic loop portion towards the disc rotor and configured to hold a corresponding one of the lug pieces, and wherein the pair of friction pads move in the disc axis direction while the holding portions hold the lug pieces, wherein the pad guide grooves are each formed into an angular U-shape having an outer side surface in a disc radial direction, an inner side surface in the disc radial direction, and an opposing surface connecting the two side surfaces, wherein each of the pair of retainer portions includes an outer side piece disposed along the outer side surface in the disc radial direction of the pad guide groove, an inner side piece disposed along the inner side surface in the disc radial direction of the pad guide groove, and a deep side piece disposed along the opposing surface of the pad guide groove and connecting the inner side piece and the outer side piece together, wherein the elastic loop portion is formed continuously to the deep side piece, and wherein each of the holding portions includes a guide piece that is a narrow elongated piece extending from the bent-back end of the elastic loop portion, the guide piece being extended towards the disc rotor in parallel to the deep side piece and disposed along an outer end surface of the corresponding one of the lug pieces, and a holding piece that is a narrow elongated piece extending from a distal end of the guide piece, the holding piece being bent to a side opposite to the deep side piece and disposed along a disc-rotor-side surface of the corresponding one of the lug pieces, wherein the holding piece includes a supporting piece projecting towards the outer side piece along the disc-rotor-side surface of the corresponding one of the lug pieces, and wherein the supporting piece has a height in a radial direction of the disc rotor which is greater than that of the guide piece.

4. The vehicle disc brake according to claim 2, wherein the inner side piece extends from an end portion of the deep side piece at an inner side in the disc radial direction while inclining outwards in the disc radial direction.

5. The vehicle disc brake according to claim 4, wherein the inner side piece has a tongue piece portion formed by cutting the inner side piece, wherein the tongue piece portion projects while inclining inwards in the disc radial direction from the deep side piece side to a distal end side of the tongue piece portion, and wherein the distal end abuts against the inner side surface in the disc radial direction of the pad guide groove.

* * * * *